(12) United States Patent
Wang

(10) Patent No.: US 11,178,604 B2
(45) Date of Patent: Nov. 16, 2021

(54) SERVICE EXECUTION METHOD AND APPARATUS

(71) Applicant: HUAWEI TECHNOLOGIES CO., LTD., Shenzhen (CN)

(72) Inventor: Qiang Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 44 days.

(21) Appl. No.: 16/709,004

(22) Filed: Dec. 10, 2019

(65) Prior Publication Data

US 2020/0112913 A1 Apr. 9, 2020

Related U.S. Application Data

(63) Continuation of application No. PCT/CN2017/087975, filed on Jun. 12, 2017.

(51) Int. Cl.
| | |
|---|---|
| *H04W 48/18* | (2009.01) |
| *H04W 76/11* | (2018.01) |
| *H04W 72/02* | (2009.01) |
| *H04W 88/08* | (2009.01) |
| *H04W 48/14* | (2009.01) |
| *H04W 48/16* | (2009.01) |

(52) U.S. Cl.
CPC .......... *H04W 48/18* (2013.01); *H04W 48/14* (2013.01); *H04W 48/16* (2013.01); *H04W 72/02* (2013.01); *H04W 76/11* (2018.02); *H04W 88/085* (2013.01)

(58) Field of Classification Search
None
See application file for complete search history.

(56) References Cited

U.S. PATENT DOCUMENTS

| 2014/0219162 A1 | 8/2014 | Eyuboglu et al. |
| 2017/0164215 A1 | 6/2017 | Chen et al. |
| 2018/0317238 A1* | 11/2018 | Roxbergh ............... H04L 5/003 |

FOREIGN PATENT DOCUMENTS

| CN | 102316055 A | 1/2012 |
| CN | 102647804 A | 8/2012 |
| CN | 103731884 A | 4/2014 |
| CN | 104144529 A | 11/2014 |
| CN | 104853417 A | 8/2015 |

(Continued)

OTHER PUBLICATIONS

Chinese Office Action issued in corresponding Chinese Application No. 201780090483.0, dated Dec. 2, 2020, pp. 1-8.

(Continued)

*Primary Examiner* — Hong S Cho
(74) *Attorney, Agent, or Firm* — Hauptman Ham, LLP

(57) ABSTRACT

A service execution method includes sending, by radio equipment, a baseband resource status to a radio equipment controller. The method also includes sending, by radio equipment controller, a first baseband configuration and a first division solution to the radio equipment. The method further includes receiving, by the radio equipment, the first baseband configuration and the first division solution. The division solution includes at least a correspondence between a target to be involved in function division and a division manner. The method additionally includes performing, by the radio equipment, a service procedure based on the first baseband configuration and the first division solution.

20 Claims, 8 Drawing Sheets

(56) References Cited

FOREIGN PATENT DOCUMENTS

| CN | 105519184 A | 4/2016 |
| EP | 2800447 A1 | 11/2014 |
| KR | 20160097802 A | 8/2016 |
| WO | 2013072108 A1 | 5/2013 |
| WO | 2015012655 A1 | 1/2015 |

OTHER PUBLICATIONS

The extended European search report dated Mar. 3, 2020 from corresponding application No. EP 17913358.2.
International search report dated Feb. 26, 2018 from corresponding application No. PCT/CN2017/087975.
Japanese Office Action issued in corresponding Japanese Application No. 2020-518111, dated Jan. 12, 2021, pp. 1-2, Japan Patent Office.

* cited by examiner

SERVICE EXECUTION METHOD AND APPARATUS

CROSS-REFERENCE TO RELATED APPLICATIONS

This application is a continuation of International Patent Application No. PCT/CN2017/087975, filed on Jun. 12, 2017, the disclosure of which is hereby incorporated by reference in its entirety.

TECHNICAL FIELD

Embodiments discussion in this specification relate to the field of communications technologies, and in particular, to a service execution method and apparatus.

BACKGROUND

There are various forms of base stations including a macro base station, a distributed base station, a small base station, and a picocell (PICO). The distributed base station includes a radio equipment controller (REC) and radio equipment (RE), and the REC and the RE are connected by using an optical fiber. The REC performs a baseband function, and the RE performs a radio frequency function. One REC may be connected to a plurality of REs, and the REC is responsible for controlling the REs connected to the REC.

As shown in FIG. 1A and FIG. 1B, baseband functions at Layer 3 (L3), Layer 2 (L2), and Layer 1 (L1) are performed by the REC, and the Intermediate Radio Frequency (RF) function is performed by the RE. In actual application, wireless network performance needs to be improved by a coordination feature between cells. To implement coordination, data exchange needs to be performed between L1s of cells or L2 of one cell and L1 of another cell. Generally, L2 and L1 are completed by an REC or completed by a plurality of RECs together. In addition, in FIG. 1A and FIG. 1B, an interface data amount is increased in each phase from left to right, that is, an interface bandwidth is increased. For example, interface bandwidths at I10, I8, I6, I4, and I1 are increased in sequence. With development of 5G technologies, antennas on the RE are increasing, and an interface bandwidth between the REC and the RE becomes larger. Therefore, to reduce the interface bandwidth between the REC and the RE, so as to reduce costs of optical modules used for interfaces and reduce processing pressure for an interface between the REC and the RE, a plurality of new function division solutions are currently proposed for the REC and the RE in the industry. For example, division is performed at a position of I4, I4+, an evolved common public radio interface (eCPRI), I6, or the like in FIG. 1A and FIG. 1B. After division is performed in the foregoing division manner, the division position is considered as a dividing line. A function on the left of the dividing line is processed by the REC, and a function on the right of the dividing line is processed by the RE. It should be noted that, the foregoing function division solutions may be regards as hard division solutions. There is usually only one manner for dividing the functions of the REC and the RE, and once a function division position is determined, a function to be implemented by each of the REC and the RE is fixed.

Solutions for dividing the functions, the interface bandwidth between the REC and the RE may be reduced, but some or all of L2 and L1 functions need to be performed by the RE, and there is usually no connection for direct data exchange between different REs. Therefore, a function division solution that can save more interface bandwidths may have greater impact on the coordination feature. If the coordination feature needs to be ensured, the interface bandwidth is inevitably increased. It is hard to achieve a balance between the coordination feature and the interface bandwidth.

SUMMARY

The discussed embodiments provide a service execution method and apparatus, to resolve a problem that it is hard to achieve a balance between a coordination feature and an interface bandwidth.

The following technical solutions are used in the discussed embodiments to achieve the foregoing objective.

An aspect of this description provides a service execution method. The method is applied to RE, and the method includes: sending, by the RE, a baseband resource status to an REC; receiving, by the RE, a first baseband configuration and a first division solution that are sent by the REC; and performing, by the RE, a service procedure based on the first baseband configuration and the first division solution, where the division solution includes at least a correspondence between a target to be involved in function division and a division manner. The REC can generate, based on the baseband resource status reported by the RE, the first baseband configuration and the first division solution that are applicable to a current application scenario. When the REC and the RE perform corresponding functions based on the first baseband configuration and the first division solution, an interface bandwidth between the REC and the RE can be reduced as much as possible while a coordination feature is ensured to a great extent, so as to achieve a balance between the coordination feature and the interface bandwidth. In this way, after the interface bandwidth between the REC and the RE is reduced, costs of optical modules used for interfaces can be effectively reduced, and costs of interface processing chips are also reduced. Because a baseband processing function may be performed by the REC and the RE together, an interface-based division process may be considered as sharing of baseband processing resources between the REC and the RE, so that hardware can be fully utilized. For example, in some cases, the RE shares baseband processing of the REC, to reduce costs of the REC. Alternatively, in some cases, the REC is used to share baseband processing of the RE, to avoid a case in which the RE needs to be replaced because the RE has insufficient baseband resources with development of services.

In some embodiments, the performing, by the RE, a service procedure based on the first baseband configuration and the first division solution may be implemented as follows: receiving, by the RE, a first signal sent by a terminal, and performing RF processing on the first signal; and performing, by the RE based on the first baseband configuration and the first division solution, a part of baseband processing on service data obtained after the RF processing, and sending first service data obtained after the part of the baseband processing to the REC; or directly sending, by the RE based on the first division solution, first service data obtained after the RF processing to the REC. In an uplink service procedure, the RE may perform a part of a baseband processing procedure for the REC based on a configuration of the REC.

In some embodiments, the performing, by the RE, a service procedure based on the first baseband configuration and the first division solution may be implemented as follows: receiving, by the RE, second service data sent by the REC; performing, by the RE, uncompleted baseband processing of the REC on the second service data based on the first baseband configuration and the first division solution; and performing RF processing on service data obtained after complete baseband processing, and sending a second signal obtained after the RF processing to the terminal. In a downlink service procedure, the RE may also perform a part of a baseband processing procedure for the REC based on a configuration of the REC.

The target to be involved in function division is indicated by a target type and a target identifier that are of the target. In some embodiments, the performing, by the RE, a service procedure based on the first baseband configuration and the first division solution may be implemented as follows: determining, by the RE based on the target type and the target identifier, a division manner corresponding to the target, and performing the service procedure based on the division manner corresponding to the target. It should be noted that, to achieve a balance between the coordination feature and the interface bandwidth in a more targeted manner, division manners of different targets may be separately determined, where each target may be uniquely determined by using a target type and a target identifier.

In some embodiments, the target type includes one of a cell, a user, and a bearer.

In some embodiments, the method further includes: receiving, by the RE, a second baseband configuration and a second division solution that are sent by the REC; and performing a service procedure based on the second baseband configuration and the second division solution, where the second baseband configuration and the second division solution are a new configuration solution that is used to update the first baseband configuration and the first division solution and that is generated by the REC after the REC determines, based on a manual command or statistics on traffic, that the division manner needs to be adjusted. The RE only needs to comply with the division manner indicated in the configuration solution delivered by the REC, namely, a division solution most recently delivered by the REC, where the division solution may be the first division solution or the second division solution. In a process in which the REC knows traffic, the RE needs to report traffic generated by the RE to the REC, and then the REC determines final traffic with reference to traffic generated by the REC and the traffic reported by the RE, and generates the second baseband configuration and the second division solution, to replace the first baseband configuration and the first division solution. Alternatively, it may be considered that the first baseband configuration and the first division solution are changed into the second baseband configuration and the second division solution.

Another aspect of this description provides a service execution method. The method is applied to an REC, and the method includes: receiving, by the REC, a baseband resource status sent by RE; generating a first baseband configuration and a first division solution based on the baseband resource status, and sending the first baseband configuration and the first division solution to the RE; and performing, by the REC, a service procedure based on the first division solution, where the division solution includes at least a correspondence between a target to be involved in function division and a division manner. The REC can generate, based on the baseband resource status reported by the RE, the first baseband configuration and the first division solution that are applicable to a current application scenario. When the REC and the RE perform corresponding functions based on the first baseband configuration and the first division solution, an interface bandwidth between the REC and the RE can be reduced as much as possible while a coordination feature is ensured to a great extent, so as to achieve a balance between the coordination feature and the interface bandwidth. In this way, after the interface bandwidth between the REC and the RE is reduced, costs of optical modules used for interfaces can be effectively reduced, and costs of interface processing chips are also reduced. Because a baseband processing function may be performed by the REC and the RE together, an interface-based division process may be considered as sharing of baseband processing resources between the REC and the RE, so that hardware can be fully utilized. For example, in some cases, the RE shares baseband processing of the REC, to reduce costs of the REC. Alternatively, in some cases, the REC is used to share baseband processing of the RE, to avoid a case in which the RE needs to be replaced because the RE has insufficient baseband resources with development of services.

In some embodiments, the service procedure performed by the REC based on the first division solution may be implemented as follows: receiving, by the REC, first service data sent by the RE; and performing uncompleted baseband processing on the first service data based on the first division solution to obtain a first packet, and sending the first packet to a core network, where the first service data is service data obtained after the RE receives a first signal sent by a terminal, performs RF processing on the first signal, and performs, based on the first baseband configuration and the first division solution, a part of baseband processing on service data obtained after the RF processing, or the first service data is service data that is obtained after processing by the RE and that is directly sent by the RE to the REC based on the first division solution. In an uplink service procedure, the RE may perform a part of a baseband processing procedure for the REC based on a configuration of the REC. Alternatively, because the REC determines that a current coordination feature needs to be ensured, the coordination feature can be improved to a great extent in a division manner in which the interface bandwidth between the RE and the REC is increased.

In some embodiments, the REC performs a service procedure based on the first division solution may be implemented as follows: receiving, by the REC, a second packet sent by the core network; and performing a part of baseband processing or complete baseband processing on the second packet based on the first division solution and a scheduling result to obtain second service data, and sending the second service data to the RE. In a downlink service procedure, the RE may perform a part of a baseband processing procedure for the REC based on a configuration of the REC. Alternatively, because the REC determines that a current coordination feature needs to be ensured, the coordination feature can be improved to a great extent in a division manner in which the interface bandwidth between the RE and the REC is increased.

In some embodiments, the target to be involved in function division is indicated by a target type and a target identifier that are of the target, and the performing, by the REC, a service procedure based on the first division solution may be implemented as follows: determining, by the REC based on the target type and the target identifier, a division manner corresponding to the target, and performing the service procedure based on the division manner corresponding to the target. It should be noted that, to achieve a balance between the coordination feature and the interface bandwidth in a more targeted manner, division manners of different targets may be separately determined, where each target may be uniquely determined by using a target type and a target identifier.

In some embodiments, the target type includes one of a cell, a user, and a bearer.

In some embodiments, the method further includes: determining, by the REC based on a manual command or statistics on traffic, whether the division manner needs to be adjusted; and if the REC determines that the division manner needs to be adjusted, generating, by the REC, a second baseband configuration and a second division solution that are used to update the division manner, and sending the second baseband configuration and the second division solution to the RE; and then performing, by the REC, the service procedure based on the second division solution. The RE only needs to comply with a division manner indicated in a baseband configuration and a division solution that are delivered by the REC. In a process in which the REC knows traffic, the RE needs to report traffic generated by the RE to the REC, and then the REC determines final traffic with reference to traffic generated by the REC and the traffic reported by the RE, and generates the second baseband configuration and the second division solution, to replace the first baseband configuration and the first division solution. Alternatively, it may be considered that the first baseband configuration and the first division solution are changed into the second baseband configuration and the second division solution.

Another aspect of this description provides a service execution apparatus. The apparatus is applied to RE, and may implement functions implemented in accordance with one or more embodiments of this disclosure. The functions may be implemented by hardware, or may be implemented by hardware executing corresponding software. The hardware or software includes one or more modules corresponding to the foregoing functions.

Another aspect of this description provides a service execution apparatus. The apparatus is applied to an REC, and may implement functions implemented in accordance with one or more embodiments of this disclosure. The functions may be implemented by hardware, or may be implemented by hardware executing corresponding software. The hardware or software includes one or more modules corresponding to the foregoing functions.

Another aspect of this description provides a computer device. The computer device includes a memory, a processor, and a computer program that is in the memory and that can be run on the processor. When the processor executes the program, one or more embodiments of this disclosure can be implemented.

Another aspect of this description provides a computer device. The computer device includes a memory, a processor, and a computer program that is in the memory and that can be run on the processor. When the processor executes the program, one or more embodiments of this disclosure can be implemented.

Another aspect of this description provides a computer storage medium, configured to store a computer software instruction used to implement functions of RE, where the computer storage medium includes a program designed to perform a method in accordance with one or more embodiments of this disclosure.

Another aspect of this description provides a computer storage medium, configured to store a computer software instruction used to implement functions of an REC, where the computer storage medium includes a program designed to perform a method in accordance with one or more embodiments of this disclosure.

DESCRIPTION OF EMBODIMENTS

The following describes technical solutions in several example embodiments with reference to the accompanying drawings.

Figure 2:
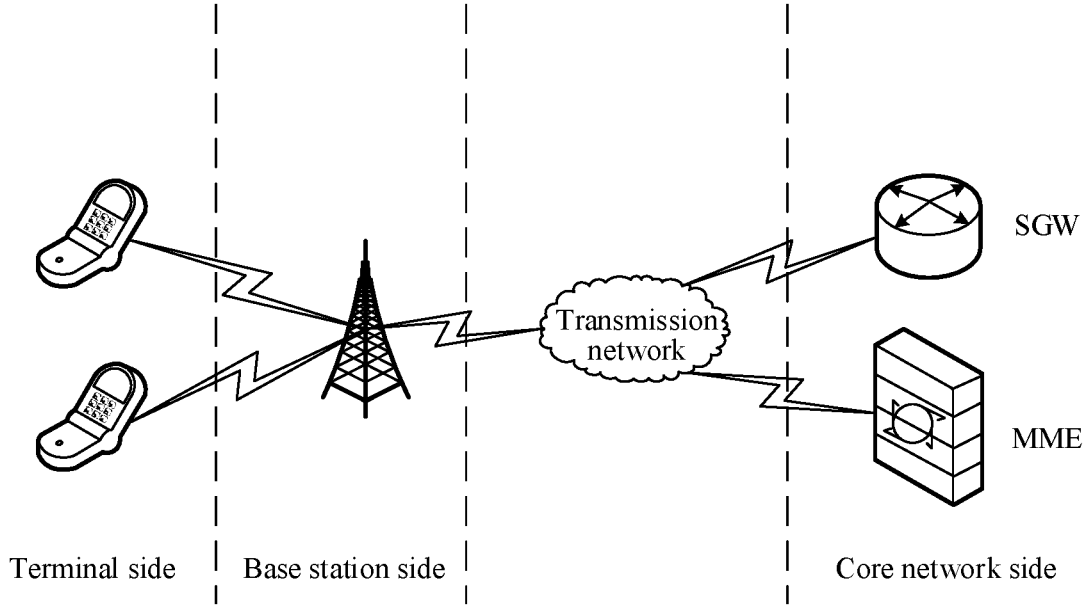
FIG. 2 is a schematic structural diagram of a network communications system, in accordance with one or more embodiments.
Figure 3:
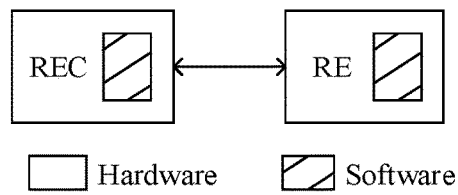
FIG. 3 is a schematic structural diagram of a radio base station, in accordance with one or more embodiments.

The discussed embodiments may be applied to a base station. The base station may be located in a network communications system, for example, a network communications system shown in FIG. 2. The network communications system includes a terminal side, a base station side, a core network side, and a transmission network. The base station side interacts with the core network side through the transmission network. On the core network side, a serving gateway (SGW) and a mobility management entity (MME) are included. The base station is located on the base station side, a hardware part of the base station may include two parts: an REC and RE, and the REC and the RE are connected by using an optical fiber. As shown in FIG. 3, each of the REC and the RE includes two parts: hardware and software. The REC may be a baseband unit (BBU), and the RE may be a remote radio unit (RRU). The REC is configured to perform baseband processing including air interface protocol processing, and control the RE. The RE is configured to perform radio frequency signal processing, including radio frequency demodulation, filtering, amplifying, and analog-to-digital conversion on an uplink signal, radio frequency modulation, amplifying, and digital-to-analog conversion on a downlink signal, and the like. Compared with a conventional implementation solution, in some embodiments, the RE may perform a radio frequency function, and may also perform some or all of baseband functions for the REC. This means that the RE is configured to perform radio frequency signal processing, and is also configured to perform a part of baseband processing. A specific implementation is provided in the following description, and details are not described herein. It should be noted that, the network communications system described in the discussed embodiments may be a long term evolution (LTE) system, or another wireless communications system using various radio access technologies, for example, a system using an access technology such as code division multiple access, frequency division multiple access, time division multiple access, orthogonal frequency division multiple access, or single carrier-frequency division multiple access. In addition, the network communications system may also be a subsequent evolved system of the LTE system, such as a 5th generation 5G system.

Figure 1A:
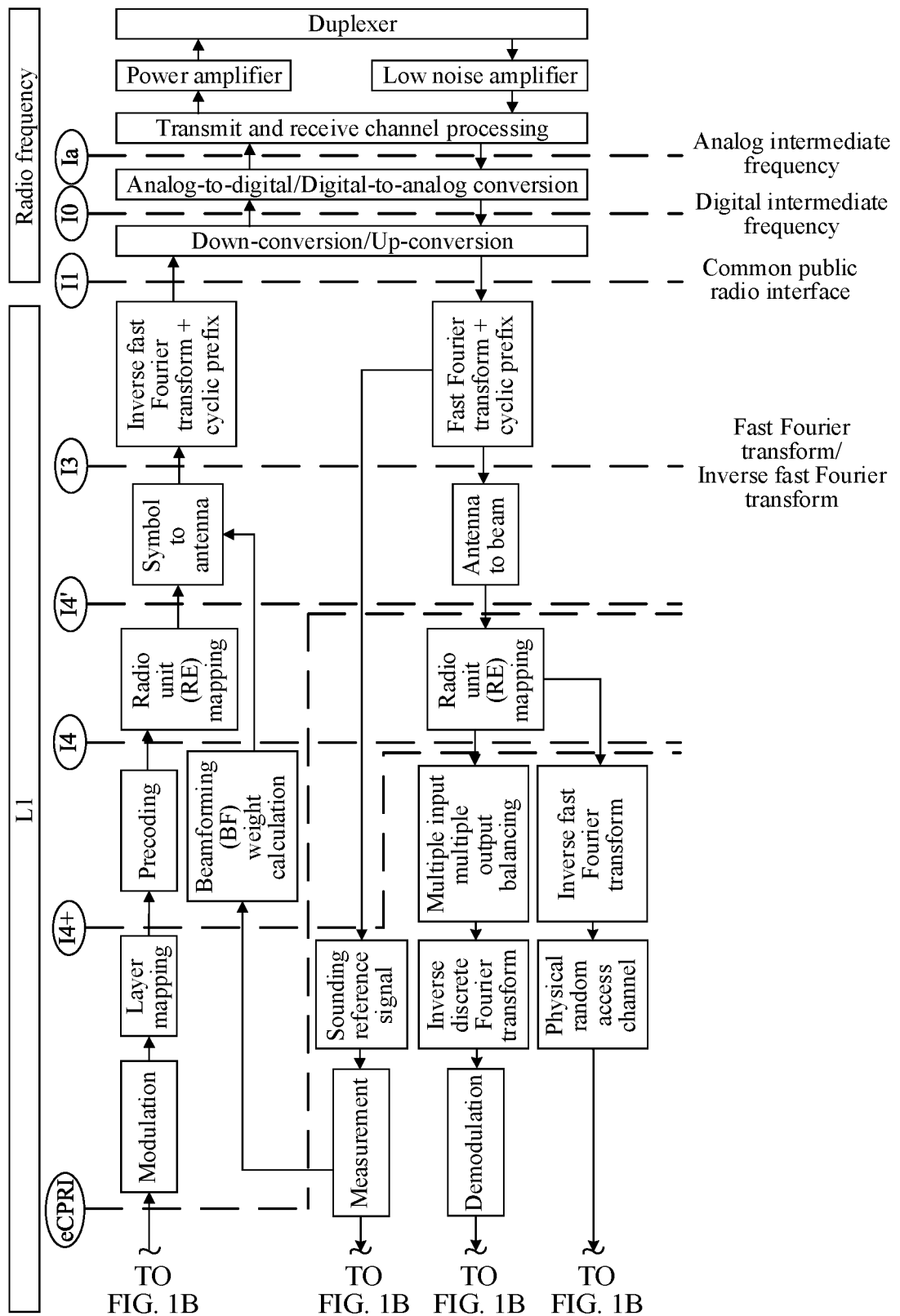
FIG. 1A and FIG. 1B are a schematic diagram of function division between an REC and RE.
Figure 1B:
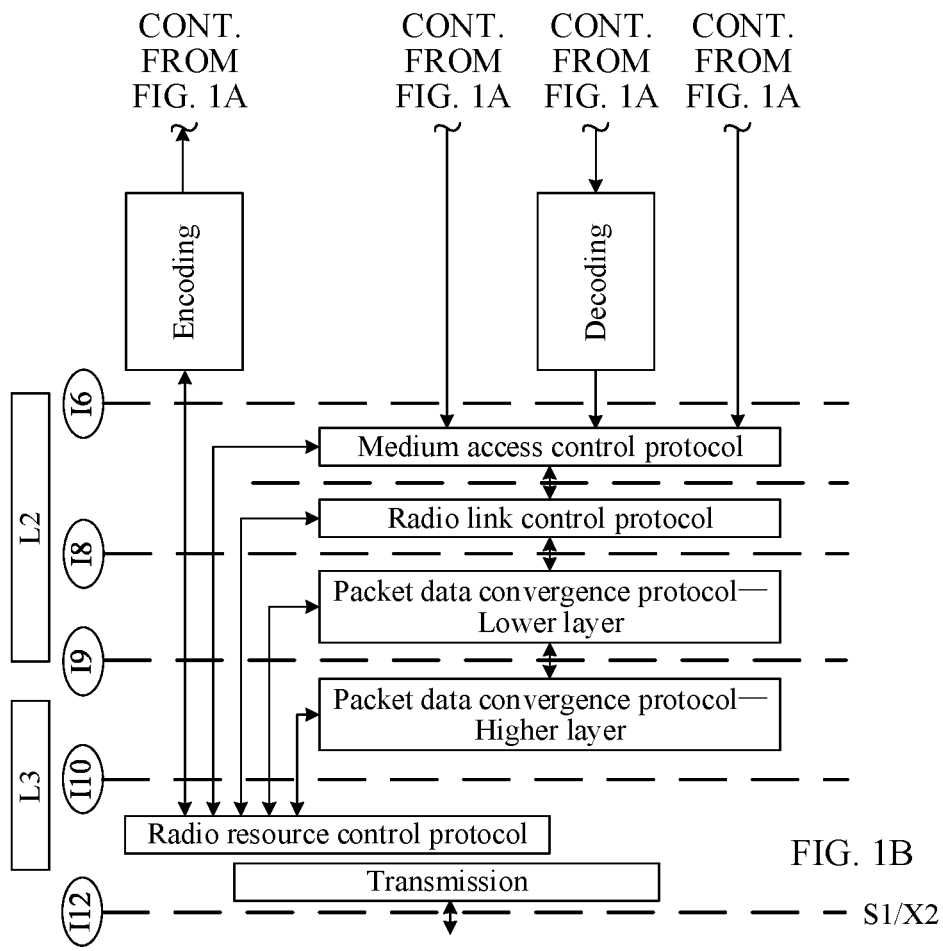

A service execution method provided in the discussed embodiments may be performed by an REC and RE shown in FIG. 3. In a service execution process, division between the REC and the RE may be performed at a corresponding interface based on a configured division solution. In the schematic diagram shown in FIG. 1A and FIG. 1B, the interface is considered as a dividing line, and a part on the left of the interface is completed by the REC. Similarly, the interface is considered as the dividing line, and a part on the right of the interface, namely, a part that is not completed by the REC, is completed by the RE. In this way, the RE needs to perform a radio frequency function, and in some cases, the RE needs to further perform some or all of baseband functions. It should be noted that, the interface-based division in FIG. 1A and FIG. 1B is merely a possible example. In an actual interface-based division process, an interface may be set between any two adjacent phases. For example, the interface I4+ is located between a phase of layer mapping and a phase of precoding (herein, only a manner of setting the interface I4+ between two specific phases is described, and another manner of setting the interface I4+ between a phase of measurement and a phase of beamforming weight calculation may further be included. Examples are not enumerated herein, and reference may be made to parts obtained through division by using a dashed line below each interface). In addition, in an actual interface-based division process, an attempt is made to determine a to-be-used interface. All interfaces shown in FIG. 1A and FIG. 1B may be included, or at least one of all interfaces shown in FIG. 1A and FIG. 1B may be included, or one or more interfaces not shown in FIG. 1A and FIG. 1B may be included.

Figure 4:
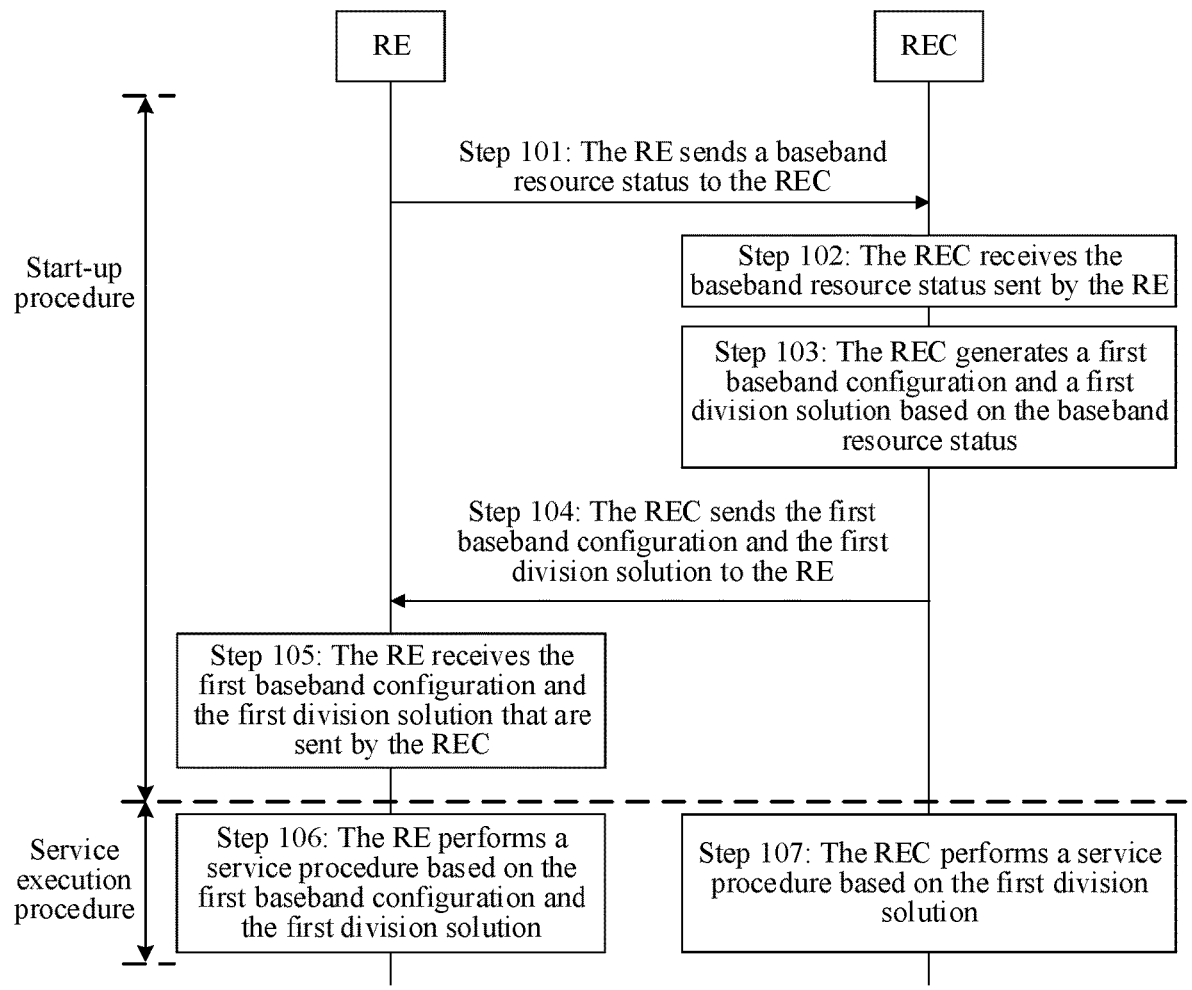
FIG. 4 is an interaction diagram of a service execution method, in accordance with one or more embodiments.

FIG. 4 shows a start-up procedure and a service execution procedure that are related to the method. The start-up procedure includes step 101 to step 105; and the service execution procedure includes step 106 and step 107.

Step 101: The RE sends a baseband resource status to the REC.

In the start-up procedure, the RE sends the baseband resource status to the REC.

In some embodiments, the baseband resource status may include a quantity of available baseband resources, such as a quantity of packet data convergence protocol (PDCP) instances, a quantity of radio link control (RLC) protocol instances, a quantity of media access control (MAC) instances, a quantity of encoder channels, a quantity of decoder channels, and the like. Examples are not enumerated herein. It should be noted that, for content included in the baseband resource status in the specification, reference may be made to content of a baseband resource status related to a start-up procedure in the prior art.

Step 102: The REC receives the baseband resource status sent by the RE.

Step 103: The REC generates a first baseband configuration and a first division solution based on the baseband resource status.

For either the first division solution mentioned herein or a second division solution to be mentioned in the following description, each division solution includes at least a correspondence between a target to be involved in function division and a division manner. In some embodiments, the target may be determined based on a target type and a target identifier. A unique target is determined based on a target type and a target identifier. The target type refers to a granularity of a target, and may include one of a cell, a user, and a bearer.

The baseband configuration may be considered as baseband working parameters that serve as reference for the REC and the RE, and may include a PCI, a subframe ratio, and the like. In some embodiments, a radio frequency function is also performed by the RE. For some implementations, reference may be made to an implementation process of a radio frequency function in the prior art. Therefore, details are not described herein. The foregoing baseband configuration is also included in start-up procedures of an REC and RE in the prior art. For specific content of the foregoing baseband configuration, reference may be made to a configuration in the prior art. Examples are not enumerated herein.

In some embodiments, the division solutions that are introduced, namely, the first division solution mentioned herein and the second division solution to be mentioned in the following description may be considered as at least two interface-based division solutions for the REC to select or one interface-based division solution provided with respect to the schematic diagram of functions division between the REC and the RE shown in FIG. 1A and FIG. 1B. It should be noted that, for the at least two interface-based division solutions for the REC to select, the REC needs to specify a proper division solution for the RE. A specific selection manner is provided in the following description, and details are not described herein.

Compared with a hard division solution in the prior art (to be specific, there is only one division manner between the REC and the RE, and once a function division position is determined, a function to be subsequently implemented by each of the REC and the RE may be fixed), after the RE reports the baseband resource status, the REC can generate, based on the baseband resource status, the first baseband configuration and the first division solution that are applicable to a current application scenario. When an interface at a division position indicated in the first division solution is considered as a dividing line, and each of the REC and the RE perform a function on one side of the dividing line, an interface bandwidth between the REC and the RE is reduced as much as possible while a coordination feature is ensured to a great extent, thereby resolving a problem that it is hard to achieve a balance between the coordination feature and the interface bandwidth. In this way, after the interface bandwidth between the REC and the RE is reduced, costs of optical modules used for interfaces can be effectively reduced, and costs of interface processing chips are also reduced. In addition, the interface bandwidth is fully utilized while impact on the coordination feature is reduced, so that the impact on the coordination feature is minimized. In some embodiments, interface-based division process may also be considered as sharing of baseband processing resources between the REC and the RE. In some cases, baseband resources of the RE are used to share baseband processing of the REC, to fully utilize hardware, and reduce costs. Alternatively, in some cases, the REC is used to share baseband processing of the RE, to avoid a case in which the RE needs to be replaced because the RE has insufficient baseband resources with development of services.

After an interface-based division position is determined, the REC may generate the first division solution in the following format:

[an instance type, an instance identifier (Instance Id), an interface identifier (Interface Id, Intf Id)]

The instance type is used to indicate a type of a target to be involved in function division, for example, one of a cell, a user, and a bearer, where the user may be considered as a granularity of division based on a connection (Connection) status, and is indicated by Connection. The instance identifier is used to indicate an identifier of a target. For example, when the type of the target is a cell, the instance identifier indicates an identifier of a cell. The interface identifier is used to indicate a specified division manner of a target corresponding to the interface identifier, that is, which interface is considered as a division position for division.

In some embodiments, once the interface identifier is determined, a unique interface is determined. An interface at which division is performed is determined. Then, the interface is considered as a dividing line, a function on the left side of the interface is performed by the REC, and a function on the right side of the interface is performed by the RE.

Step 104: The REC sends the first baseband configuration and the first division solution to the RE.

After the REC determines the first baseband configuration and the first division solution, the REC not only needs to use the first division solution to perform a service procedure, but also needs to deliver the first baseband configuration and the first division solution to the RE, so that the RE completes a service procedure based on the same first division solution and the first baseband configuration configured by the REC for the RE.

It should be noted that, the first baseband configuration and the first division solution may be sent by the REC to the RE simultaneously or at different times, provided that it is ensured that the RE performs the service procedure after receiving the first baseband configuration and the first division solution. Whether the first baseband configuration and the first division solution are sent simultaneously is not limited herein.

Step 105: The RE receives the first baseband configuration and the first division solution that are sent by the REC.

After the RE receives the first baseband configuration and the first division solution that are sent by the REC, the RE may send a response message to the REC to notify the REC that the RE has received the first baseband configuration and the first division solution that are delivered by the REC.

Step 106: The RE performs the service procedure based on the first baseband configuration and the first division solution.

Step 107: The REC performs the service procedure based on the first division solution.

The service procedure includes an uplink service procedure and a downlink service procedure. It should be noted that, an order of performing step 106 and step 107 shown in FIG. 4 is not limited. For example, in an execution process of the service procedure, the RE and the REC may perform different service procedures during a same period of time.

For content of service execution procedures in the foregoing step 106 and step 107, specific implementation processes of different types of service procedures are separately described in the following description, and details are not described herein.

The REC can generate, based on the baseband resource status reported by the RE, the first baseband configuration and the first division solution that are applicable to the current application scenario. When the REC and the RE perform corresponding functions based on the first baseband configuration and the first division solution, the interface bandwidth between the REC and the RE can be reduced as much as possible while the coordination feature is ensured to a great extent, so as to achieve a balance between the coordination feature and the interface bandwidth. In this way, after the interface bandwidth between the REC and the RE is reduced, the costs of the optical modules used for interfaces can be effectively reduced, and the costs of the interface processing chips are also reduced. In some embodiments, because a baseband processing function may be performed by the REC and the RE together, the interface-based division process may be considered as the sharing of baseband processing resources between the REC and the RE, so that hardware can be fully utilized. For example, in some cases, the RE shares baseband processing of the REC, to reduce costs of the REC. Alternatively, in some cases, the REC is used to share baseband processing of the RE, to avoid a case in which the RE needs to be replaced because the RE has insufficient baseband resources with development of services.

Figure 5:
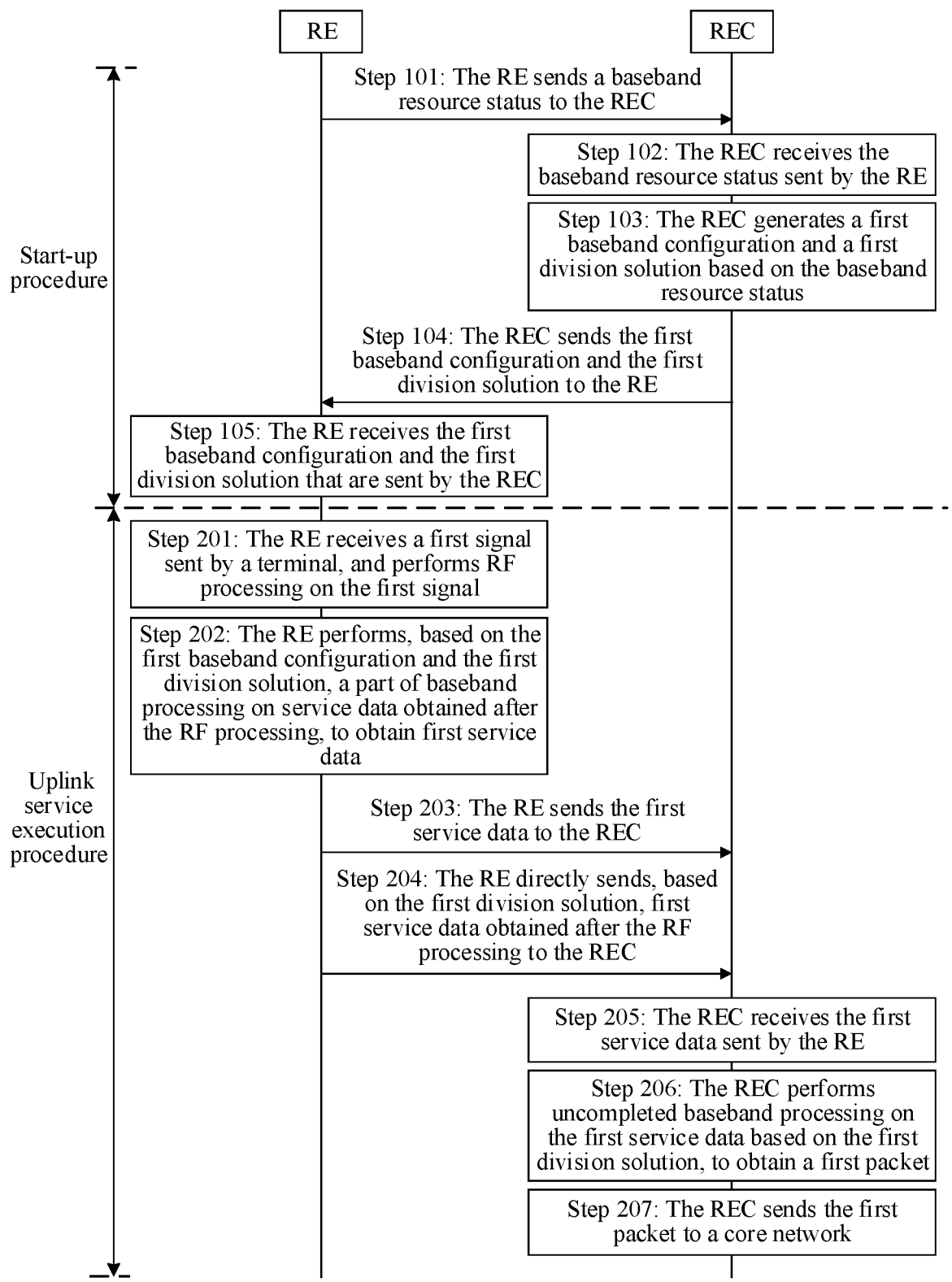
FIG. 5 to FIG. 8 are interaction diagrams of another service execution method, in accordance with one or more embodiments.

For a status of an uplink service procedure, on a basis of the implementation shown in FIG. 4, an implementation shown in FIG. 5 may be provided. The step 106 in which the RE performs the service procedure based on the first baseband configuration and the first division solution may be replaced with step 201 to step 203, or step 201 and step 204. The step 107 in which the REC performs the service procedure based on the first division solution may be replaced with step 205 to step 207.

Step 201: The RE receives a first signal sent by a terminal, and performs RF processing on the first signal.

The RF processing includes performing radio frequency demodulation, filtering, amplifying, analog-to-digital conversion, and the like on the first signal. For a specific implementation, reference may be made to an RF processing procedure in the prior art.

Step 202: The RE performs, based on the first baseband configuration and the first division solution, a part of baseband processing on service data obtained after the RF processing, to obtain first service data.

Step 203: The RE sends the first service data to the REC.

Step 204: The RE directly sends, based on the first division solution, first service data obtained after the RF processing to the REC.

In some embodiments, the RE performs, based on the first baseband configuration and the first division solution that are delivered by the REC, the part of the baseband processing on the service data obtained after the RF processing, or does not perform baseband processing. It should be noted that, when a division manner indicated in the first division solution is division to be performed at an interface I1, the RE needs to perform only the RF processing, that is, in this case, the RE does not need to perform baseband processing on the signal obtained after the RF processing. Similarly, in this case, if a division manner indicated in the first division solution is division to be performed at an interface within a corresponding range of L1 or L2 in FIG. 1A and FIG. 1B, the RE necessarily needs to perform the part of the baseband processing on the service data obtained after the RF processing.

This means that, whether the RE needs to perform baseband processing on the signal obtained after the RF processing depends on the division manner indicated in the first division solution delivered by the REC, namely, an interface corresponding to a division position.

Step 205: The REC receives the first service data sent by the RE.

Step 206: The REC performs uncompleted baseband processing on the first service data based on the first division solution, to obtain a first packet.

In a case in which the RE does not perform baseband processing, the REC needs to perform a complete baseband processing procedure. In a case in which the RE has performed the part of the baseband processing, the REC needs to complete a part of a baseband processing procedure that is not completed. The latter case is equivalent to that the RE performs the part of baseband processing that should have been performed by the REC. In addition, the interface bandwidth between the RE and the REC is reduced.

Step 207: The REC sends the first packet to a core network.

In the uplink service procedure, the RE may perform a part of the baseband processing procedure for the REC based on the first division solution configured by the REC. Alternatively, because the REC determines that the coordination feature needs to be currently ensured, a gain of the coordination feature is improved to a great extent in a division manner in which the interface bandwidth between the RE and the REC is relatively high.

Figure 6:
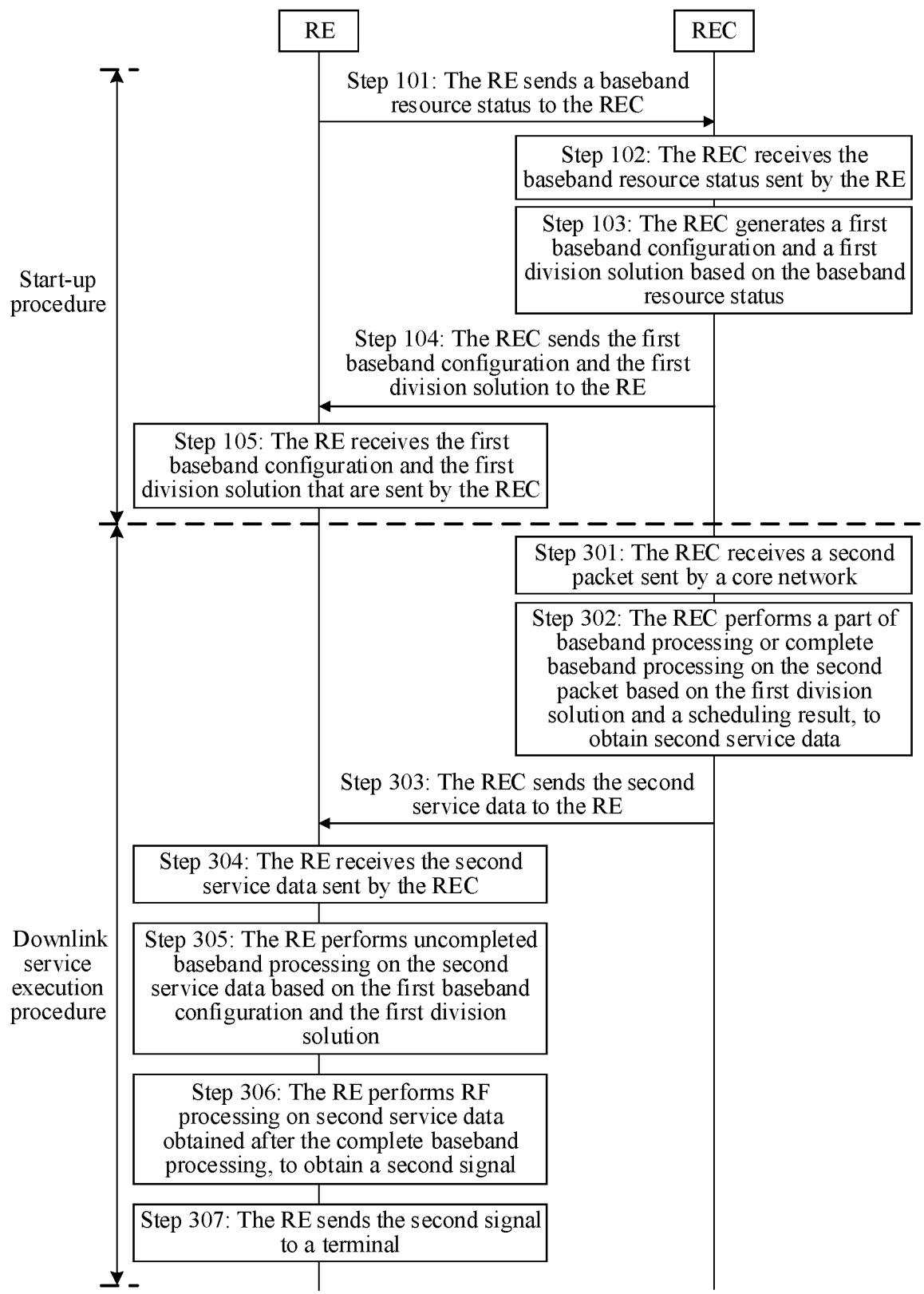

For a downlink service procedure, on a basis of the implementations shown in FIG. 4 and FIG. 5, FIG. 3 is used as an example, and an implementation shown in FIG. 6 may also be provided. The step 107 in which the REC performs the service procedure based on the first division solution may be replaced with step 301 to step 303. The step 106 in which the RE performs the service procedure based on the first baseband configuration and the first division solution may be replaced with step 304 to step 307.

Step 301: The REC receives a second packet sent by a core network.

After the REC receives the second packet, the REC may locally buffer the second packet for subsequent processing.

Step 302: The REC performs a part of baseband processing or complete baseband processing on the second packet based on the first division solution and a scheduling result, to obtain second service data.

Because the REC has preset the first division solution, the REC may directly perform processing on the second packet based on an indication of the first division solution. To be specific, when a division manner set in the first division solution indicates that the REC needs to perform the part of the baseband processing, the REC needs to perform only the part of the baseband processing on the second packet, and send the second service data obtained after the processing to the RE, and the RE completes the part of uncompleted baseband processing. Alternatively, when a division manner set in the first division solution indicates that the REC needs to independently perform the complete baseband processing, the REC performs the complete baseband processing, and forwards the obtained second service data to the RE, and in this case, the RE does not need to perform baseband processing on the second service data.

Step 303: The REC sends the second service data to the RE.

Step 304: The RE receives the second service data sent by the REC.

Step 305: The RE performs the uncompleted baseband processing on the second service data based on the first baseband configuration and the first division solution.

It should be noted that, if the REC has completed an entire baseband processing procedure, the RE does not need to perform additional baseband processing based on the indication of the first division solution. In other words if the REC performs the complete baseband processing, the RE does not need to perform baseband processing based on the first division solution. Similarly, if the REC performs only the part of the baseband processing, the RE further needs to perform the uncompleted baseband processing based on the first baseband configuration and the first division solution.

Step 306: The RE performs RF processing on second service data obtained after the complete baseband processing, to obtain a second signal.

For the RF processing performed by the RE, reference may be made to a downlink service processing procedure in the prior art, and details are not described herein.

Step 307: The RE sends the second signal to a terminal.

In the downlink service procedure, the RE may also perform a part of the baseband processing procedure for the REC based on the first baseband configuration and the first division solution that are configured by the REC. Alternatively, because the REC determines that the coordination feature needs to be currently ensured, a gain of the coordination feature is improved to a great extent in a division manner in which the interface bandwidth between the RE and the REC is relatively high.

It should be noted that, the division manner may include division manners corresponding to different targets. This means that, compared with a conventional hard division manner (there is only one division manner between the REC and the RE, and once the division manner is determined, the division manner may not be adjusted), in some embodiments, different division manners may be used based on different granularities (which is flexible division). Therefore, on a basis of the implementations shown in FIG. 4, FIG. 5, and FIG. 6, FIG. 4 is used as an example, and an implementation shown in FIG. 7 may also be provided. The step 107 in which the REC performs the service procedure based on the first division solution may be specifically implemented as step 401 and step 402. The step 106 in which the RE performs the service procedure based on the first baseband configuration and the first division solution may be specifically implemented as step 403 and step 404.

Step 401: The REC determines, based on a target type and a target identifier, a division manner corresponding to a target.

It should be noted that, a unique target can be determined based on a target type and a target identifier.

Step 402: The REC performs a service procedure based on the division manner corresponding to the target.

Step 403: The RE determines, based on the target type and the target identifier, the division manner corresponding to the target.

Step 404: The RE performs a service procedure based on the division manner corresponding to the target.

Either the REC or the RE performs the corresponding service procedure based on the division manner determined by the REC. When the REC determines the division manner, an actual status of a cell, a user, or a bearer may be considered. For example, it is considered that there are two types of users in a system. For a user of type A, a first type of division manner may be used. For a user of type B, a second type of division manner may be used. The user of type A and the user of type B may be two types of users having different requirements on the coordination feature and/or different requirements on the interface bandwidth between the RE and the REC. Division manners that are selected as the first type of division manner and the second type of division manner may be different, for example, may be I3 and I6 respectively shown in FIG. 1A and FIG. 1B.

It should be noted that, targets of different granularities may be determined by the REC. A specific determining manner may be determined based on traffic, a load status, and the like in a specific period, or a specific determining manner may directly be configured by an operator based on a requirement of the operator. This is not limited herein.

Figure 8:
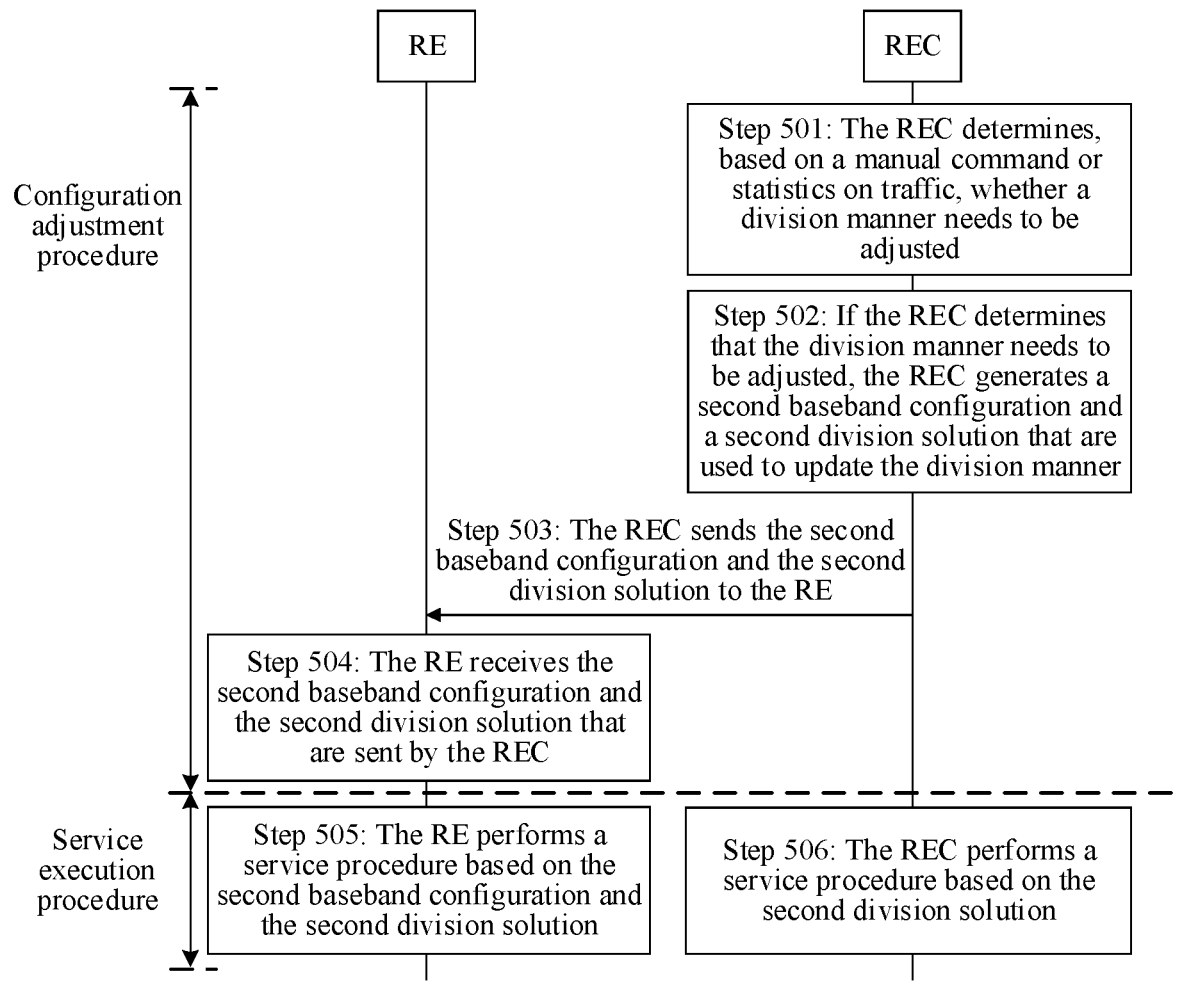

In some embodiments, different division manners may be used for different targets. In addition, when a division manner is determined, the REC triggers a corresponding adjustment process based on a manual command or statistics on traffic, to adjust configuration information and notify the RE of adjusted configuration information. FIG. 8 shows a process of configuring a second baseband configuration and a second division solution based on statistics on traffic. A process of adjusting a baseband configuration and a division solution (to be specific, the first baseband configuration is changed into or replaced with the second baseband configuration, and the first division solution is changed into or replaced with the second division solution) is described in step 501 to step 504, and a service execution procedure is described in step 505 and step 506.

Step 501: The REC determines, based on a manual command or statistics on traffic, whether a division manner needs to be adjusted.

Step 502: If the REC determines that the division manner needs to be adjusted, the REC generates the second baseband configuration and the second division solution that are used to update the division manner.

It should be noted that, the second baseband configuration has a same format as the first baseband configuration, and the second division solution has a same format as the second division solution. Reference may be made to the description of the configuration information. Similarly, a sending manner of the second baseband configuration and the second division solution is the same as a processing procedure of the first baseband configuration and the first division solution. Reference may be made to the foregoing description, and details are not described herein. When a baseband configuration and a division solution are adjusted, a division manner suitable for current traffic may be selected based on a preset correspondence between traffic and a division manner, or a division manner is directly specified by a user. A basis for adjusting the baseband configuration and the division manner is not limited.

Step 503: The REC sends the second baseband configuration and the second division solution to the RE.

Step 504: The RE receives the second baseband configuration and the second division solution that are sent by the REC.

Step 505: The RE performs a service procedure based on the second baseband configuration and the second division solution.

Step 506: The REC performs a service procedure based on the second division solution.

A process of performing the service procedure based on the second baseband configuration and the second division solution shown in step 505 and step 506 is similar to an implementation process of step 106 and step 107 in the foregoing description. A difference lies in that different baseband configurations and different division manners are used. In one case, the service procedure is performed based on an original configuration (that is, the first baseband configuration and the first division solution), and in the other case, the service procedure is performed based on an adjusted configuration (that is, the second baseband configuration and the second division solution). For a specific implementation of step 505 and step 506, reference may be made to the foregoing descriptions of step 106 and step 107, and the descriptions of step 401 to step 404. Details are not described herein.

The RE only needs to comply with content indicated in the baseband configuration and the division solution that are delivered by the REC. However, in a process in which the REC knows a traffic status, the RE needs to report traffic generated by the RE to the REC, and then the REC determines final traffic based on traffic generated by the REC and the traffic reported by the RE, and generates the second baseband configuration and the second division solution, to replace original configuration information. It may alternatively be considered that original configuration information is changed into new configuration information.

The following provides several feasible examples, which are considered as possible implementations but should not be construed as an excessive limitation to the discussed embodiments. For example, a quantity of antennas on RE, a division manner, a target type, and the like should not be construed as an excessive limitation to the discussed embodiments.

For example, in some embodiments, a quantity of antennas on the RE is not greater than 32, and it is expected that the coordination feature is ensured to a great extent while the interface bandwidth is within an acceptable range. In this case, the REC determines to use division I1 for all cells of the RE (to be specific, an interface I1 is considered as a division position for division, IRF processing is performed by the RE, and L1, L2 and L3 functions are implemented by the REC).

In a start-up procedure, a value of an Intf Schema in a division solution delivered by the REC to the RE is as follows: an Instance Type is a cell, an Instance Id is instance numbers of all the cells of the RE, and an Intf Id indicates a division manner I1, where the Intf Schema is used to indicate an interface-based division manner.

In an uplink service procedure, the RE does not perform baseband processing based on the Intf Schema delivered by the REC. In other words, no baseband processing is performed. The REC performs complete baseband processing based on the Intf Schema delivered to the RE.

In a downlink service procedure, the REC performs complete baseband processing on service data based on the Intf Schema delivered to the RE and a scheduling result. The RE does not perform baseband processing based on the Intf Schema delivered by the REC. In other words, no baseband processing is performed.

For steps that are not mentioned in the foregoing start-up procedure, uplink service procedure, and downlink service procedure, reference may be made to the various steps in the foregoing embodiment, and details are not described herein. In addition, if there is no emphasis or description, a procedure of L3 processing that is not mentioned is performed by the REC by default.

For another example, in some embodiments, a quantity of antennas on the RE is not less than 64, and it is expected that the interface bandwidth is reduced as much as possible while there is no requirement on the coordination feature. In this case, the REC determines to use division I6 for all cells of the RE (to be specific, the interface I6 is considered as a division position for division, IRF processing is performed by the RE, L1 functions are implemented by the RE, and L2 and L3 functions are implemented by the REC).

In a start-up procedure, a value of an Intf Schema in a division solution delivered by the REC to the RE is as follows: an Instance Type is a cell, an Instance Id is instance numbers of all the cells of the RE, and an Intf Id indicates a division manner I6.

In an uplink service procedure, the RE performs baseband processing, namely, L1 processing, based on the Intf Schema delivered by the REC. The REC performs baseband processing, namely, L2 processing, based on the Intf Schema delivered to the RE.

In a downlink service procedure, the REC performs L2 baseband processing on service data based on the Intf Schema delivered to the RE and a scheduling result. The RE performs L1 baseband processing based on the Intf Schema delivered by the REC.

For steps that are not mentioned in the foregoing start-up procedure, uplink service procedure, and downlink service procedure, reference may be made to the various steps in the foregoing embodiment, and details are not described herein. In addition, if there is no emphasis or description, a procedure of L3 processing that is not mentioned is performed by the REC by default.

For another example, in some embodiments, a quantity of antennas on the RE is relatively large, for example, is not less than 64, and different cells of same RE have different requirements. For example, a cell at a coverage layer has a higher requirement on the coordination feature, and a cell at a capacity layer has a lower requirement or has no requirement on the coordination feature. In this case, differentiated division manners may be used. For example, division I1 is used for the cell at the coverage layer, and division I6 is used for the cell at the capacity layer. Therefore, it is determined that the cell at the coverage layer is a cell of type A, and it is determined that the cell at the capacity layer is a cell of type B. Different division manners are used for the cell of type A and the cell of type B.

It should be noted that, the coverage layer and the capacity layer are concepts in wireless coverage networking. The coverage layer is used for basic wireless coverage, and continuous coverage is required. Therefore, there is a requirement on the coordination feature. The capacity layer is used to improve a wireless system capacity in a hotspot area, and continuous coverage is not required. Therefore, there is a low requirement on the coordination feature. The coverage layer and the capacity layer have different radio frequency channel numbers. In addition, the cell of type A and the cell of type B are configured by a user or determined based on a strategy determined by a system, and this is not limited herein.

In a start-up procedure, a value of an Intf Schema in configuration information delivered by the REC to the RE is as follows: an instance type is a cell; an instance Id is an instance number of all cells of the RE; and for the cell of type A, an Intf Id indicates a division manner I1, and for the cell of type B, the Intf Id indicates a division manner I6. It should be noted that, because a division manner of a cell has been determined when a division solution is delivered, the division solution delivered by the REC carries only one division manner for each cell, namely, a division manner corresponding to a current cell.

In an uplink service procedure, based on the Intf Schema delivered by the REC, the RE does not perform baseband processing for the cell of type A, and performs baseband processing, namely, L1 processing for the cell of type B. Based on the Intf Schema delivered to the RE, the REC performs complete baseband processing for the cell of type A, and performs baseband processing, namely, L2 processing for the cell of type B.

In a downlink service procedure, based on the Intf Schema delivered to the RE and a scheduling result, the REC performs L1 and L2 baseband processing on service data for the cell of type A, and performs L2 baseband processing on service data for the cell of type B. Based on the Intf Schema delivered by the REC, the RE does not perform baseband processing on service data for the cell of type A, and performs L1 baseband processing on service data for the cell of type B.

For steps that are not mentioned in the foregoing start-up procedure, uplink service procedure, and downlink service procedure, reference may be made to the various steps in the foregoing embodiment, and details are not described herein. In addition, if there is no emphasis or description, a procedure of L3 processing that is not mentioned is performed by the REC by default.

For another example, in some embodiments, a quantity of antennas on the RE is relatively large, for example, is not less than 64, and different cells of same RE have different requirements. For example, a cell at a coverage layer has a higher requirement on the coordination feature, and a cell at a capacity layer has a lower requirement or has no requirement on the coordination feature. In this case, differentiated division manners may be used. For example, division I1 is used for the cell at the coverage layer, division I6 is used for the cell at the capacity layer, and some cells automatically switch between the two division manners I1 and I6 based on an operation status. Therefore, all cells of the RE may be classified into three types: a cell of type A, a cell of type B, and a cell of type C. It is determined that the cell at the coverage layer is the cell of type A, it is determined that the cell at the capacity layer is the cell of type B, and the cells that may automatically switch between the division manners are cells of type C, where a division manner of the cell of type C may be the same as or different from that of the cell of type A or the cell of type B.

Because a baseband processing capability reserved by the RE is limited, with development of the Internet of Things, it is inevitable that specifications for a user are insufficient, replacement costs (including equipment and installation costs) of the RE are too high, and carriers usually expect to implement smooth evolution without replacing the RE. In this scenario, some cells of the RE are expected to have flexibility. To be specific, when the RE has an insufficient baseband processing capability, some baseband processing functions may be transferred to the REC for processing. The cells are cells of type C.

In a start-up procedure, a value of an Intf Schema in a division solution delivered by the REC to the RE is as follows: an instance type is a cell (cell); an instance Id is an instance number of all cells of the RE; and for the cell of type A, an Intf Id indicates the division manner I1, for the cell of type B, an Intf Id indicates the division manner I6, and for the cell of type C, an Intf Id indicates a division manner that has been determined from the division manner I1 or I6. It should be noted that, because a cell has been determined, and the division manner has been determined for the cell of type C when a division solution is delivered, configuration information delivered by the REC carries only one division manner for each cell, namely, a division manner corresponding to a current cell.

In an uplink service procedure, based on the Intf Schema delivered by the REC, the RE does not perform baseband processing for the cell of type A; performs baseband processing, namely, L1 processing for the cell of type B; and performs corresponding baseband processing, namely, the L1 processing, or does not perform baseband processing for the cell of type C based on the division manner corresponding to the cell of type C. Based on the Intf Schema delivered to the RE, the REC performs complete baseband processing for the cell of type A; performs baseband processing, namely, L2 processing for the cell of type B; and performs corresponding baseband processing, namely, the L2 processing, or the complete baseband processing for the cell of type C based on the division manner corresponding to the cell of type C.

In a downlink service procedure, based on the Intf Schema delivered to the RE and a scheduling result, the REC performs L1 and L2 baseband processing on service data for the cell of type A, performs L2 baseband processing on service data for the cell of type B, and performs corresponding baseband processing, namely, the L2 processing, or the L1 and L2 processing for the cell of type C based on the division manner corresponding to the cell of type C. Based on the Intf Schema delivered by the REC, the RE does not perform baseband processing on service data for the cell of type A, performs L1 baseband processing on service data for the cell of type B, and performs corresponding baseband processing, namely, the L1 processing, or does not perform baseband processing for the cell of type C based on the division manner corresponding to the cell of type C.

For steps that are not mentioned in the foregoing start-up procedure, uplink service procedure, and downlink service procedure, reference may be made to the various steps in the foregoing embodiment, and details are not described herein. In addition, if there is no emphasis or description, a procedure of L3 processing that is not mentioned is performed by the REC by default.

If the division manner needs to be dynamically adjusted, the REC may determine, based on statistics on traffic, that the RE has an insufficient baseband processing capability and that there is a need for adjustment, calculate a quantity of cells that need to be adjusted, obtain a specific adjusted division manner, and start a division manner adjustment procedure. A value of an Intf Schema in a division solution delivered by the REC to the RE is as follows: an instance type is a cell, an instance Id is an instance number of all the cells that need to be adjusted, and an Intf Id indicates a division manner obtained after an instance of each cell is adjusted.

From the foregoing embodiments, cell type division or adjustment on a baseband configuration and a division solution are all completed by the REC. It should be noted that, in the foregoing embodiments, description is provided by using the cell as a target granularity. Similarly, division may also be performed based on a user type or a bearer type, and a baseband configuration and a division solution may be configured or adjusted. Details are not described herein.

A service execution apparatus may be disposed in the RE, and to implement the foregoing functions, the service execution apparatus includes a corresponding hardware structure and/or software module for performing each function. A person skilled in the art should be easily aware that, in combination with the example units and algorithm steps described, one or more embodiments can be implemented by hardware or a combination of hardware and computer software. Whether a function is performed by hardware or hardware driven by computer software depends on particular applications and design constraints of the technical solutions. The person skilled in the art may use different methods to implement the described functions for each particular application, but it should not be considered that the implementation goes beyond the scope of this disclosure.

In some embodiments, function module division may be performed on the service execution apparatus according to the foregoing method examples. For example, the function modules may be obtained through division in correspondence to the functions, or at least two functions may be integrated into one processing module. The integrated module may be implemented in a form of hardware, or may be implemented in a form of a software function module. It should be noted that the module division in the discussed embodiments is an example, and is logical function division. There may be another division manner in actual implementation.

Figure 9:
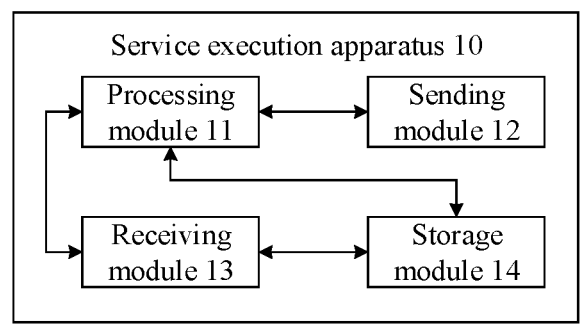
FIG. 9 is a schematic structural diagram of a service execution apparatus, in accordance with one or more embodiments.

FIG. 9 is a possible schematic structural diagram of a service execution apparatus according to the foregoing embodiments. A service execution apparatus 10 includes a processing module 11, a sending module 12, and a receiving module 13.

Figure 7:
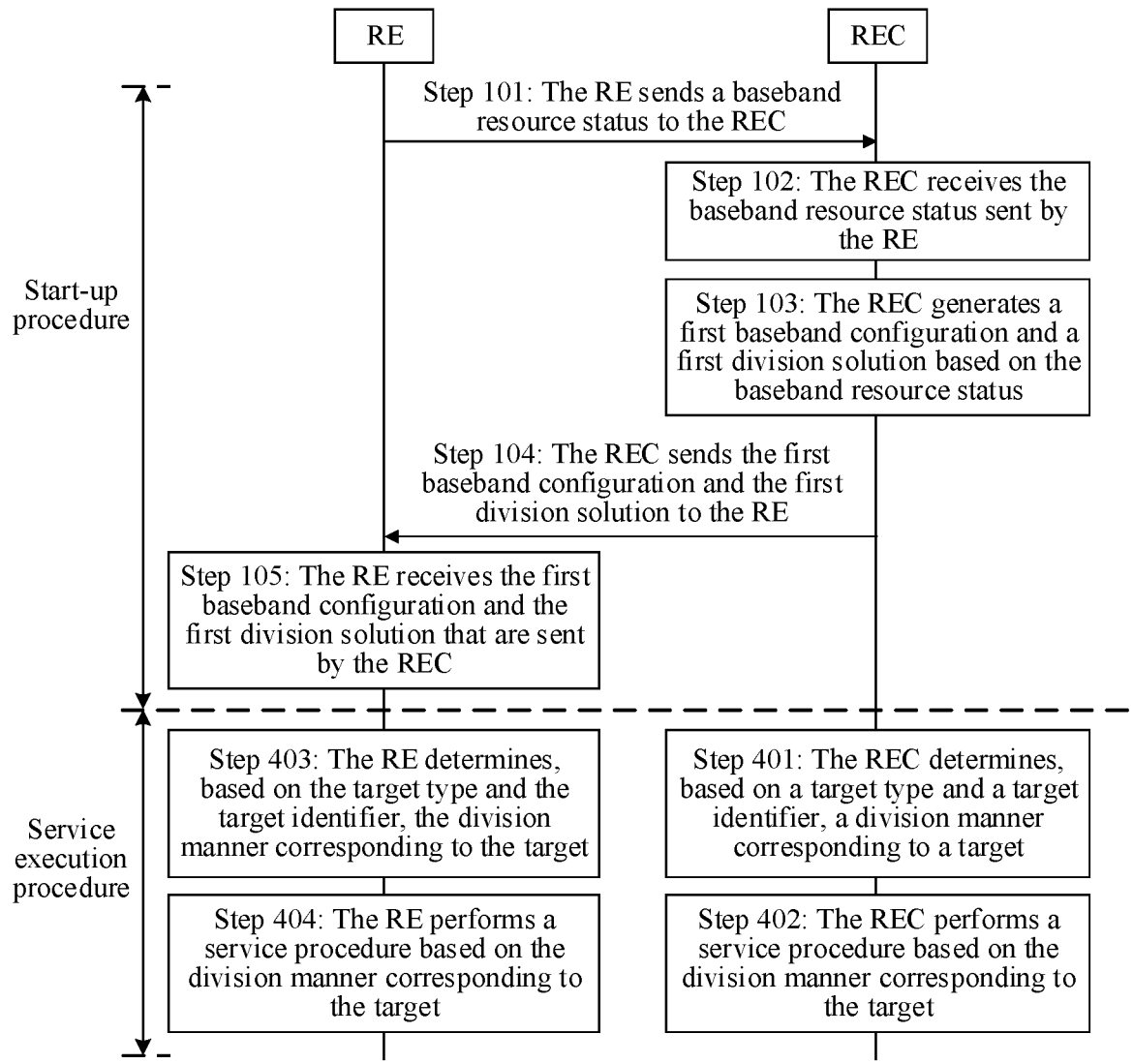

The processing module 11 is configured to support the service execution apparatus 10 in performing step 106 in FIG. 4, step 202 in FIG. 5, step 305 and step 306 in FIG. 6, step 403 and step 404 in FIG. 7, and step 505 in FIG. 8. The sending module 12 is configured to support the service execution apparatus 10 in performing step 101 in FIG. 4 to FIG. 7, step 203 and step 204 in FIG. 5, and step 307 in FIG. 6. The receiving module 13 is configured to support the service execution apparatus 10 in performing step 105 in FIG. 4 to FIG. 7, and step 504 in FIG. 8. It should be noted that, the processing module 11 is further configured to implement other processes of the technologies described in the specification. The sending module 12 and the receiving module 13 are configured to support the service execution apparatus 10 in exchanging data with each module in the RE, and/or support the RE in communicating with another device such as an REC, a terminal, or the like. In addition, the service execution apparatus 10 may also be provided with a storage module 14 that is configured to store program code and data that are of the RE.

The processing module 11 may be implemented as a processor or a controller, for example, may be a central processing unit (CPU), a general-purpose processor, a digital signal processor (DSP), an application-specific integrated circuit (ASIC), a field programmable gate array (FPGA), or another programmable logical device, a transistor logic device, a hardware component, or any combination thereof. The processing module 11 may implement or execute various example logical blocks, modules, and circuits described with reference to content disclosed. Alternatively, the processor may be a combination implementing a computing function, for example, a combination of one or more microprocessors, or a combination of a DSP and a microprocessor. The receiving module 12 and the sending module 13 may be implemented as a receiver/transmitter, a transceiver circuit, a communications interface, or the like. The storage module 14 may be implemented as a memory.

Figure 10:
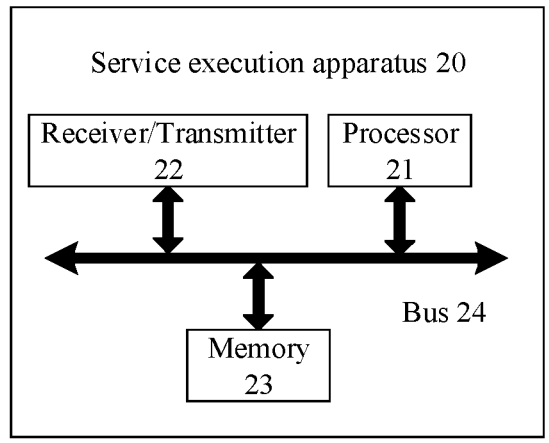
FIG. 10 is schematic a structural diagram of a service execution apparatus, in accordance with one or more embodiments.

If the processing module 11 is implemented as a processor, the receiving module 12 and the sending module 13 are implemented as a receiver/transmitter, and the storage module 14 is implemented as a memory, as shown in FIG. 10, a service execution apparatus 20 includes a processor 21, a receiver/transmitter 22, a memory 23, and a bus 24. The processor 21, the receiver/transmitter 22, and the memory 23 are interconnected by using the bus 24. The bus 24 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 10, but this does not mean that there is only one bus or only one type of bus.

A service execution apparatus may be disposed in the REC, and to implement the foregoing functions, the service execution apparatus includes a corresponding hardware structure and/or software module for performing each function. A person skilled in the art should be easily aware that, in combination with the example units and algorithm steps described, one or more embodiments can be implemented by hardware or a combination of hardware and computer software. Whether a function is performed by hardware or hardware driven by computer software depends on particular applications and design constraints of the technical solutions. The person skilled in the art may use different methods to implement the described functions for each particular application, but it should not be considered that the implementation goes beyond the scope of the present disclosure.

In some embodiments, function module division may be performed on the service execution apparatus according to the foregoing method examples. For example, the function modules may be obtained through division in correspondence to the functions, or at least two functions may be integrated into one processing module. The integrated module may be implemented in a form of hardware, or may be implemented in a form of a software function module. It should be noted that the module division in the discussed embodiments is an example, and is logical function division. There may be another division manner in actual implementation.

Figure 11:
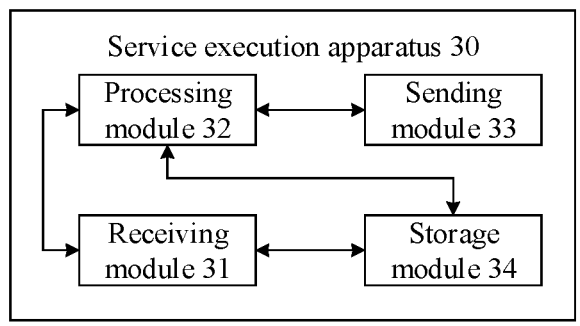
FIG. 11 is schematic a structural diagram of a service execution apparatus, in accordance with one or more embodiments.

FIG. 11 is a possible schematic structural diagram of a service execution apparatus according to the foregoing embodiments. The service execution apparatus 30 includes a receiving module 31, a processing module 32, and a sending module 33.

The receiving module 31 is configured to support the service execution apparatus 30 in performing step 102 in FIG. 4 to FIG. 7, step 205 in FIG. 5, and step 301 in FIG. 6. The processing module 32 is configured to support the service execution apparatus 30 in performing step 103 in FIG. 4 to FIG. 7, step 107 in FIG. 4, step 206 in FIG. 5, step 302 in FIG. 6, and step 401 and step 402 in FIG. 7. The sending module 33 is configured to support the service execution apparatus 30 in performing step 104 in FIG. 4 to FIG. 7, step 207 in FIG. 5, step 303 in FIG. 6, and step 503 in FIG. 8. In addition, the service execution apparatus 30 may also be provided with a storage module 34 that is configured to store program code and data that are of the REC.

The processing module 32 may be implemented as a processor or a controller, for example, may be a CPU, a general-purpose processor, a DSP, an ASIC, an FPGA or another programmable logic device, a transistor logic device, a hardware component, or any combination thereof. The processing module 32 may implement or execute various example logical blocks, modules, and circuits described with reference to content disclosed. Alternatively, the processor may be a combination implementing a computing function, for example, a combination of one or more microprocessors, or a combination of a DSP and a microprocessor. The receiving module 31 and the sending module 33 may be implemented as a transceiver, a transceiver circuit, a communications interface, or the like. The storage module 34 may be implemented as a memory.

Figure 12:
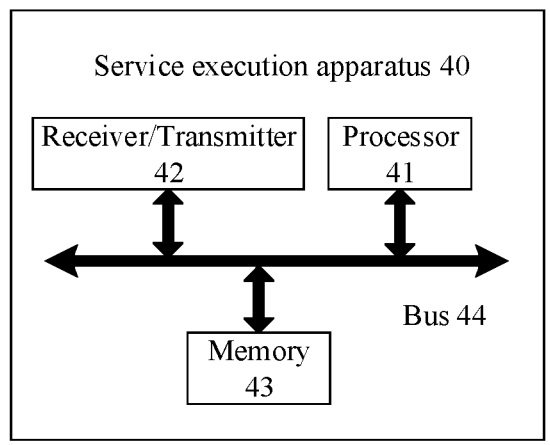
FIG. 12 is schematic a structural diagram of a service execution apparatus, in accordance with one or more embodiments.

If the processing module 32 is implemented as a processor, the receiving module 31 and the sending module 33 are implemented as a receiver/transmitter, and the storage module 34 is implemented as a memory, as shown in FIG. 12, a service execution apparatus 40 includes a processor 41, a receiver/transmitter 42, a memory 43, and a bus 44. The processor 41, the receiver/transmitter 42 and the memory 43 are interconnected by using the bus 44. The bus 44 may be a PCI bus, an EISA bus, or the like. The bus may be classified into an address bus, a data bus, a control bus, and the like. For ease of representation, only one thick line is used to represent the bus in FIG. 11, but this does not mean that there is only one bus or only one type of bus.

Methods or algorithm steps described with reference to the content disclosed may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be deployed in a same device, or the processor and the storage medium may be deployed in different devices as discrete components.

A person skilled in the art should be aware that in the foregoing one or more examples, functions described in the discussed embodiments may be implemented by hardware, software, firmware, or any combination thereof. When the discussed embodiment are implemented by software, these functions may be stored in a computer readable medium or transmitted as one or more instructions or code in a computer readable medium. The computer readable medium includes a computer storage medium and a communications medium, where the communications medium includes any medium that enables a computer program to be transmitted from one place to another. The storage medium may be any available medium accessible to a general-purpose or special-purpose computer.

In the foregoing description, the objectives, technical solutions, and benefits of the embodiments are described in detail. It should be understood that the foregoing descriptions are merely example implementations of the embodiments, but are not intended to limit the protection scope of this disclosure. Any modification, equivalent replacement, improvement, or the like made based on the technical solutions in the discussed embodiments shall fall within the protection scope of the present disclosure.

What is claimed is:

1. A service execution method, applied to radio equipment, the method comprising:
   sending, by the radio equipment, a baseband resource status to a radio equipment controller;
   receiving, by the radio equipment controller, the baseband resource status;
   sending, by the radio equipment controller, a first baseband configuration and a first division solution to the radio equipment;
   receiving, by the radio equipment, the first baseband configuration and the first division solution, wherein the division solution comprises at least a correspondence between a target to be involved in function division and a division manner; and performing, by the radio equipment, a service procedure based on the first baseband configuration and the first division solution.

2. The method according to claim 1, wherein the performing of the service procedure by the radio equipment comprises:

receiving, by the radio equipment, a first signal sent by a terminal, and performing radio frequency processing on the first signal;

performing, by the radio equipment based on the first baseband configuration and the first division solution, a part of a baseband processing on service data obtained after the radio frequency processing; and sending first service data obtained after the part of the baseband processing to the radio equipment controller; or sending, based on the first division solution, first service data obtained after the radio frequency processing to the radio equipment controller.

3. The method according to claim 1, wherein the performing of the service procedure by the radio equipment comprises:

sending, by the radio equipment controller, second service data to the radio equipment;

receiving, by the radio equipment, the second service data;

performing, by the radio equipment, uncompleted baseband processing on the second service data based on the first baseband configuration and the first division solution;

performing, by the radio equipment, radio frequency processing on service data obtained after complete baseband processing; and sending a second signal obtained after the radio frequency processing to the terminal.

4. The method according to claim 1, wherein the target to be involved in function division is indicated by a target type and a target identifier, and the performing, by the radio equipment, a service procedure based on the first baseband configuration and the first division solution comprises:

determining, by the radio equipment based on the target type and the target identifier, a division manner corresponding to the target, and performing the service procedure based on the division manner corresponding to the target.

5. The method according to claim 1, wherein the target type comprises at least one of a cell, a user, or a bearer.

6. The method according to claim 1, wherein the method further comprises:

sending, by the radio equipment controller, a second baseband configuration and a second division solution to the radio equipment;

receiving, by the radio equipment, the second baseband configuration and the second division solution; and performing, by the radio equipment, a service procedure based on the second baseband configuration and the second division solution.

7. A service execution apparatus applied to radio equipment, the apparatus comprising:

a transmitter configured to send a baseband resource status to a radio equipment controller;

a receiver configured to receive a first baseband configuration and a first division solution that are sent by the radio equipment controller, wherein the division solution comprises at least a correspondence between a target to be involved in function division and a division manner; and a processor configured to perform a service procedure based on the first baseband configuration and the first division solution that are received by the receiver.

8. The apparatus according to claim 7, wherein the receiver is further configured to receive a first signal from a terminal, the processor is further configured to:

perform radio frequency processing on the first signal, and perform, based on the first baseband configuration and the first division solution, a part of a baseband processing on service data obtained after the radio frequency processing, and the transmitter is further configured to:

send first service data obtained after the part of the baseband processing to the radio equipment controller; or send, based on the first division solution, first service data obtained after the radio frequency processing to the radio equipment controller.

9. The apparatus according to claim 7, wherein the receiver is further configured to receive second service data from the radio equipment controller, the processor is further configured to:

perform uncompleted baseband processing on the second service data based on the first baseband configuration and the first division solution; and perform radio frequency processing on service data obtained after complete baseband processing, and the transmitter is further configured to send a second signal obtained after the radio frequency processing to the terminal.

10. The apparatus according to claim 7, wherein the target to be involved in function division is indicated by a target type and a target identifier, and the processing module is further configured to determine, based on the target type and the target identifier, a division manner corresponding to the target, and perform the service procedure based on the division manner corresponding to the target.

11. The apparatus according to claim 7, wherein the target type comprises one of a cell, a user, and a bearer.

12. The apparatus according to claim 7, wherein the receiver is further configured to receive a second baseband configuration and a second division solution from the radio equipment controller, and the processor is further configured to perform a service procedure based on the second baseband configuration and the second division solution.

13. A service execution system, comprising radio equipment and radio equipment controller, wherein the radio equipment is configured to send a baseband resource status to the radio equipment controller, the radio equipment controller is configured to receive the baseband resource status, generate a first baseband configuration and a first division solution based on the baseband resource status, and send the first baseband configuration and the first division solution to the radio equipment, wherein the division solution comprises at least a correspondence between a target to be involved in function division and a division manner, and the radio equipment is configured to receive the first baseband configuration and the first division solution, and perform a service procedure based on the first baseband configuration and the first division solution.

14. The system according to claim 13, wherein
the radio equipment is configured to:
   perform a service procedure based on the first baseband configuration and the first division solution;
   perform radio frequency processing on a first signal from a terminal;
   perform, based on the first baseband configuration and the first division solution, a part of baseband processing on service data obtained after the radio frequency processing; and
   send first service data obtained after the part of the baseband processing to the radio equipment controller.

15. The system according to claim 14, wherein the radio equipment controller is further configured to:
   receive the first service data from the radio equipment;
   perform uncompleted baseband processing on the first service data based on the first division solution, to obtain a first packet; and
   send the first packet to a core network.

16. The system according to claim 13, wherein the radio equipment is configured to:
   perform a service procedure based on the first baseband configuration and the first division solution;
   perform radio frequency processing on a first signal from a terminal; and
   send, based on the first division solution, first service data obtained after the radio frequency processing to the radio equipment controller.

17. The system according to claim 13, wherein the radio equipment is configured to:
   perform a service procedure based on the first baseband configuration and the first division solution;
   receive second service data from the radio equipment controller;
   perform uncompleted baseband processing on the second service data based on the first baseband configuration and the first division solution;
   perform radio frequency processing on service data obtained after complete baseband processing; and
   send a second signal obtained after the radio frequency processing to the terminal.

18. The system according to claim 13, wherein
a target to be involved in function division is indicated by a target type and a target identifier, and
the RE is configured to:
   perform a service procedure based on the first baseband configuration and the first division solution;
   determine, based on the target type and the target identifier, a division manner corresponding to the target; and
   perform the service procedure based on the division manner corresponding to the target.

19. The system according to claim 13, wherein the target type comprises at least one of a cell, a user, or a bearer.

20. The system according to claim 13, wherein the radio equipment is further configured to:
   receive a second baseband configuration and a second division solution from the radio equipment controller; and
   perform a service procedure based on the second baseband configuration and the second division solution.

* * * * *